United States Patent [19]

Sasaki et al.

[11] Patent Number: 5,260,879
[45] Date of Patent: Nov. 9, 1993

[54] NUMERICAL CONTROL APPARATUS

[75] Inventors: Takao Sasaki, Hachioji; Kentaro Fujibayashi, Musashino; Toshiaki Otsuki, Hino; Hideo Ogino, Minamitsuru, all of Japan

[73] Assignee: Fanuc Ltd, Minamitsuru, Japan

[21] Appl. No.: 773,592

[22] PCT Filed: Mar. 13, 1991

[86] PCT No.: PCT/JP91/00356
§ 371 Date: Nov. 21, 1991
§ 102(e) Date: Nov. 21, 1991

[87] PCT Pub. No.: WO91/14979
PCT Pub. Date: Oct. 3, 1991

[30] Foreign Application Priority Data

Mar. 29, 1990 [JP] Japan ................. 2-81692

[51] Int. Cl.⁵ .................. B23F 1/00; G05B 19/21
[52] U.S. Cl. ................. 364/474.35; 364/474.02; 364/474.12; 409/2
[58] Field of Search ........... 364/474.02, 474.12, 364/474.3, 474.35; 409/2, 11, 12, 15; 318/625

[56] References Cited

U.S. PATENT DOCUMENTS

| | | |
|---|---|---|
| 4,414,495 | 11/1983 | Sumi et al. |
| 4,585,377 | 4/1986 | Nozawa et al. ............. 364/474.02 |
| 4,695,960 | 9/1987 | Reimann et al. ............ 364/474.02 |
| 5,037,252 | 8/1991 | Hasegawa et al. .................. 409/2 |

FOREIGN PATENT DOCUMENTS

| | | |
|---|---|---|
| 0067232 | 12/1982 | European Pat. Off. |
| 0360190 | 3/1990 | European Pat. Off. |
| 61-188019 | 8/1986 | Japan .................. 409/2 |

Primary Examiner—Jerry Smith
Assistant Examiner—Steven R. Garland
Attorney, Agent, or Firm—Staas & Halsey

[57] ABSTRACT

Disclosed is a numerical control apparatus for controlling a numerically controlled machine tool such as a hobbing machine and the like. An axis control circuit (14) provided with a synchronization control means (8) controls the rpm of a spindle motor (5) and the rpm of a servo motor (11) based on feedback pulses supplied from a position coder (7) connected to a hob axis (3), so that a ratio of the rpm of the hob axis (3) to the rpm of a C-axis (13) has a given value. A first internal counter (15a) monitors the number of feedback pulses supplied from the position coder (7) and a second internal counter (15b) monitors the number of pulses distributed to the C-axis (13), and when a ratio of the rpm of the hob axis (3) to the rpm of the C-axis (13) is to be changed, a correction pulse calculation means (9) calculates correction pulses based on the number of rotation pulses of the hob axis (3) and the number of the rotation pulses of the C-axis (13) counted by the first and second internal counters (15a, 15b). The correction pulses are supplied to the C-axis (13) to accelerate or decelerate the rpm of the C-axis (13) and thereby achieve a new synchronous relationship between the hob axis (3) and the C-axis (13) during the rotation of the hob axis (3) and C-axis (13).

4 Claims, 4 Drawing Sheets

NUMERICAL CONTROL APPARATUS

DESCRIPTION

1. Technical Field

The present invention relates to a numerical control apparatus for controlling a numerically controlled (NC) gear cutting machine such as a hobbing machine and the like, and more specifically, to a numerical control apparatus for controlling an NC gear cutting machine by which a synchronous relationship between the spindle axis of a hob and the rotation axis of a gear to be cut is changed without canceling the synchronization.

2. Background Art

A hobbing machine for cutting a gear is used in combination with a numerical control apparatus, and in the hobbing machine, a spindle axis (hereinafter, referred to as a hob axis) must be synchronized with the rotation axis (hereinafter, referred to as a C-axis) of a gear to be cut (hereinafter, referred to as a workpiece), and accordingly, feedback pulses supplied from the position coder equipped with the hob axis are distributed to the C-axis at a given ratio.

Nevertheless, since the NC hobbing machine does not monitor the number of pulses of the hob axis and C-axis, which are always synchronized, the synchronous relationship therebetween must be changed after the synchronization once has been canceled, and as a result, the rotation of the C-axis is stopped, and thus a cutting start point must be located when a plurality of gears having a different module must be cut.

To overcome the above drawback, the applicant filed Japanese Patent Application No. Hei 1-337058 entitled "Numerical Control Apparatus".

Although this invention enables a change in an NC hobbing machine of the synchronous relationship of a synchronized hob axis and a C-axis without canceling the synchronization, a considerable amount of time must pass before a new synchronization is achieved after a synchronization change command has been issued.

Note, an NC hobbing machine provided with a plurality of hobs for cutting a plurality of workpieces is often used, and in this type of hobbing machine, the synchronization must be changed as quickly as possible.

DISCLOSURE OF THE INVENTION

Taking the above into consideration, an object of the present invention is to provide a numerical control apparatus for controlling an NC gear cutting machine by which a change to a new synchronous relationship between a hob axis and a C-axis without canceling the synchronization can be achieved within one rotation of the hob axis.

To attain the above object, according to the present invention, there is provided a numerical control apparatus for controlling a numerically controlled machine tool such as a hobbing machine and the like, which comprises a synchronization control means having an axis control circuit for converting feedback pulses from a position coder connected to a spindle axis for rotating a hob by a command including a ratio of the rpm of said spindle axis to the rpm of a rotation axis for rotating a gear to be cut, and for outputting a rotation command to a spindle motor and a rotation command to said rotation axis, a first internal counter for counting the feedback pulses from said position coder and a second internal counter for counting the rotation command to be given to said rotation axis, and a correction pulse calculation means for calculating a correction pulse for maintaining a new synchronous relationship without stopping the rotation of said spindle axis and said rotation axis when commands for a different rpm of said spindle axis and an rpm of said rotation axis are input.

The axis control circuit provided with a synchronization control means controls the rpm of the spindle motor and the rpm of a C-axis based on the feedback pulses supplied from the position coder connected to the hob axis, so that a ratio of the rpm of the hob axis to the rpm of a C-axis has a given value. Further, the first internal counter constantly monitors the number of feedback pulses supplied from the position coder and the second internal counter constantly monitors the number of pulses distributed to the C-axis.

When a ratio of the rpm of the hob axis to the rpm of the C-axis is to be changed, the calculation means calculates correction pulses based on the number of rotation pulses of the hob axis and the number of rotation pulses of the C-axis counted by the first and second counters, and the correction pulses are supplied to the C-axis to accelerate or decelerate the rpm of the C-axis, to thereby align the hob axis and the C-axis in a new synchronous relationship, during the rotation of the hob axis and C-axis.

BEST MODE OF CARRYING OUT THE INVENTION

An embodiment of the present invention will be described below with reference to the drawings.

Figure 1:
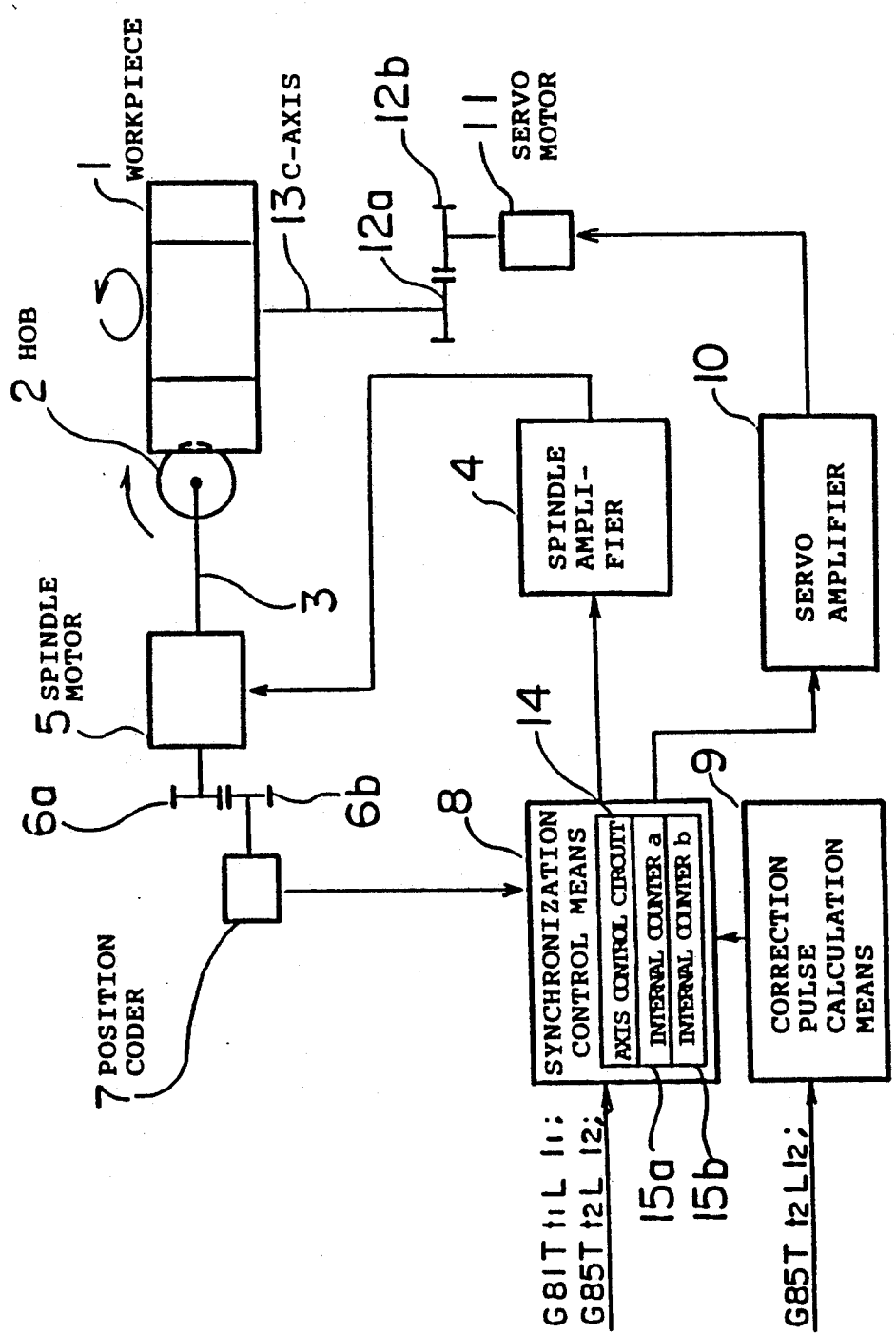
FIG. 1 is a conceptual view of the present invention.

FIG. 1 is a conceptual view of the present invention. A workpiece 1 is a gear to be cut and a C-axis 13 serving as a rotation axis for rotating the workpiece 1 is rotated by a servo motor 11 through gears 12a and 12b. A hob 2 is mounted on a hob axis 3 as a spindle axis and rotated by a spindle motor 5 for cutting the gear of the workpiece 1. A position coder 7 is connected to the spindle motor 5 through gears 6a and 6b and outputs feedback pulses in proportion to the rotation of the spindle motor 5. The feedback pulses are supplied to a synchronization control means 8 and counted by the internal counter a 15a, and when the internal counter a 15a has counted the feedback pulses output during one rotation of the hob axis 3, the counter 15a restarts the count from 1.

The axis control circuit 14 equipped with the synchronization control means 8 supplies a rotation command including the rpm of the hob axis 3 to a spindle amplifier 4, and further supplies a rotation command including the rpm of the C-axis 13 to a servo amplifier 10. The ratio of the rpm of the hob axis 3 to the rpm of the C-axis 13 is set to a given ratio. The spindle amplifier 4 drives the spindle motor 5 in response to the rotation command supplied from the axis control circuit 14 to rotate the hob axis, and in the same way, the servo amplifier 10 drives the servo motor 11 in response to the rotation commanded from the axis control circuit 14 to rotate the C-axis 13. An internal counter 15b counts command pulses sent to the C-axis, and when the internal counter 15b has counted the commanded pulses output during one rotation of the C-axis 13, the counter 15b restarts the count from 1. With this arrangement, the internal counters 15a and 15b monitor the number of pulses of both axes, which are always synchronized.

The synchronization command is carried out according to the following format.

G81T$t_1$L$l_1$;

where, G81 is a synchronization start command, $t_1$ is the number of teeth of a gear, and $l_1$ is the number of grooves of a hob. Note that the ratio of the rpm of the hob axis to the rpm of the C-axis is $t_1:l_1$.

When a synchronization change command is issued to change the ratio of the rpm of the hob axis 3 to the rpm of the C-axis, a correction pulse calculation means 9 calculates correction pulses based on the number of the counts made by the internal counters 15a and 15b and supplies same to the synchronization control means 8. The correction pulses are output from the synchronization control means 8 and used to change the rpm of the servo motor 11 through the servo amplifier 10, and when the correction pulses have been distributed, a change to a synchronization having a new rotation ratio is achieved.

The new synchronization command is carried out in accordance with the following format.

G85T$t_2$L$l_2$;

where, G85 is a synchronization change command, $t_2$ is the number of teeth of a gear, and $l_2$ is the number of grooves of a hob. Note that the ratio of the rpm of the hob axis to the rpm of the C-axis is $t_2:l_2$.

Figure 2:
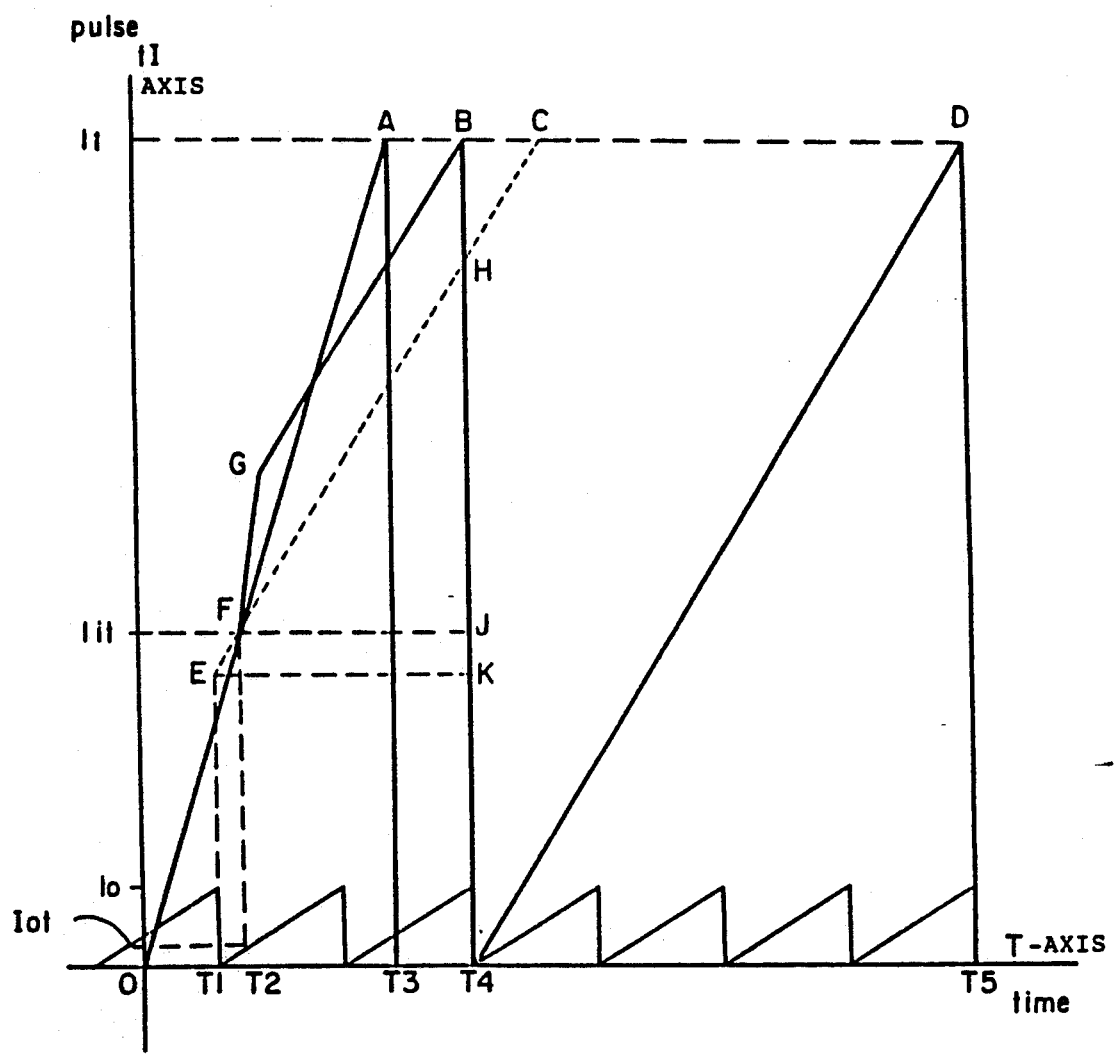
FIG. 2 is a diagram showing values of the internal counters of a hob axis and a C-axis according to the present invention.

FIG. 2 is a diagram showing values of the internal counters of the hob axis and the C-axis according to the present invention. In this example, the synchronization start command and synchronization change command are carried out according to the following formats.

G81T2L1;

where, G81 is a synchronization start command, 2 is the number of teeth of a gear, and 1 is the number of grooves of a hob. Note that the ratio of the rpm of the hob axis to the rpm of the C-axis is 2:1.

G85T4L1;

where, G85 is a synchronization change command, 4 is the number of teeth of a gear, and 1 is the number of grooves of a hob. Note that the ratio of the rpm of the hob axis to the rpm of the C-axis is 4:1.

Further, in the figure, a T-axis represents a time and an I-axis represents the number of pulses counted by the internal counters. The number of rotation pulses of the hob axis and C-axis is cleared to an initial state when these axes start a cutting operation, i.e., each of the internal counters has a value of 0 and after the cutting operation is started, the relationship between the hob axis and the C-axis is monitored based upon the values of the internal counters.

The value Io of the I-axis represents the number of pulses output during one rotation of the hob axis, i.e., a maximum value of the counted number of pulses fed back from the position coder connected to the hob axis. The value Ii of the I-axis represents the number of pulses output during one rotation of the C-axis, i.e., a maximum value of the rotation command pulses supplied to the servo amplifier. Consequently, when the number of pulses of the hob axis has reached Io, the count is restarted from 1, and thus the rotation state of the hob is shown by a saw-tooth waveform.

The origin of the T-axis and I-axis is represented by O and the time at which the synchronization change command is issued is represented by T2. The time on the T-axis at which the rotation pulses of the hob axis at the origin O of the coordinate is increased to the maximum value Io is represented by T1. The time after the hob axis has rotated twice from the time T1 on the T-axis is represented by T4, and the time after the hob axis has rotated four times from the time T4 on the T-axis is represented by T5. The time after the hob axis has rotated twice from the origin O of the coordinate is represented by T3.

The coordinates (T3, Ii), (T4, Ii) and (T5, Ii) are represented by a point A, a point B and a point C. The number of pulses of the hob axis is represented by Iot, the number of pulses of the C-axis is represented by Iit at the time T2, and the coordinate (T2, Iit) is represented by a point F.

The point at which a straight line parallel to a straight line T4 - D and passing through the point F intersects I=Ii is represented by a point C, and the point at which the above straight line intersects T=T1 is represented by a point E. The coordinate (T4, Iit) is represented by a point J and the point at which a straight line parallel to the T-axis and passing through the point E intersects a straight line B - T4 is represented by a point K.

(a) In this example, when the synchronization change command G85T4L1 is issued after the synchronization start command G81T2L1 has been issued, the number of rpm of the hob axis: the number of rpm of the C-axis in the synchronous relationship is changed from 2:1 to 4:1.

(b) The number of correction pulses to be supplied to the C-axis for a synchronization thereof is calculated from the number of rotation pulses Iot of the hob axis and the number of rotation pulses Iit of the C-axis at the time T2 at which the command G85T4L1 was issued. In this example, the number of correction pulses is determined from the following expressions.

$$Ih = MOD_{IA}[(Ii - Iit) + IA(Iot/Io)]$$

where,

Ih: the number of correction pulses, i.e., a line segment BH in the figure;

(Ii−Iit): the number of pulses remaining in the C-axis for which the C-axis must be rotated until it has completed one full rotation from the time T2, i.e., a line segment BJ in the figure;

IA (Iot/Io): the number of pulses necessary for a rotation of the C-axis while the number of rotation pulses of the hob axis changes from 0 to Iot, i.e., a line segment JK in the figure;

$MOD_{IA}$: a remainder obtained by being divided by the remainder of an arithmetic operator (handled as an integer), i.e., a remainder obtained when [(Ii−Iit)+IA (Iot/Io)] is divided by IA; and IA: ($\frac{1}{2}$) Ii, i.e., the number of pulses of the C-axis during one rotation of the hob axis.

(c) The correction pulses calculated in (b) are distributed at a maximum feed speed and output to the C-axis. The correction pulses are supplied at the maximum cutting speed to achieve a change to a new synchronization as soon as possible within a safe range. The correction pulses are added along a line segment FG in the figure and the addition thereof is completed at the point G in the figure.

(d) A new synchronous relationship starts from the point at which the correction pulses have been added. A straight line GB in the figure represents a new synchronization (4:1) and is parallel to straight lines EC and T4D.

As described above, the correction pulses are calculated based on the number of rotation pulses of the hob axis and C-axis counted by the internal counters, and therefore, when the distribution of the correction pulses has been completed, a new synchronous relationship is established while the hob axis and C-axis are rotated. More specifically, the new synchronous relationship is achieved within a time in which one full rotation of the hob axis is completed from the time at which the synchronization change command was issued.

Further, when the positional relationship of the hob axis and C-axis to be synchronized is incorrect, correction pulses for correcting the amount of displacement can be calculated based on the number of rotation pulses of the hob axis and C-axis counted by the internal counters, and the positional displacement is corrected by applying the correction pulses to the C-axis.

Figure 3:
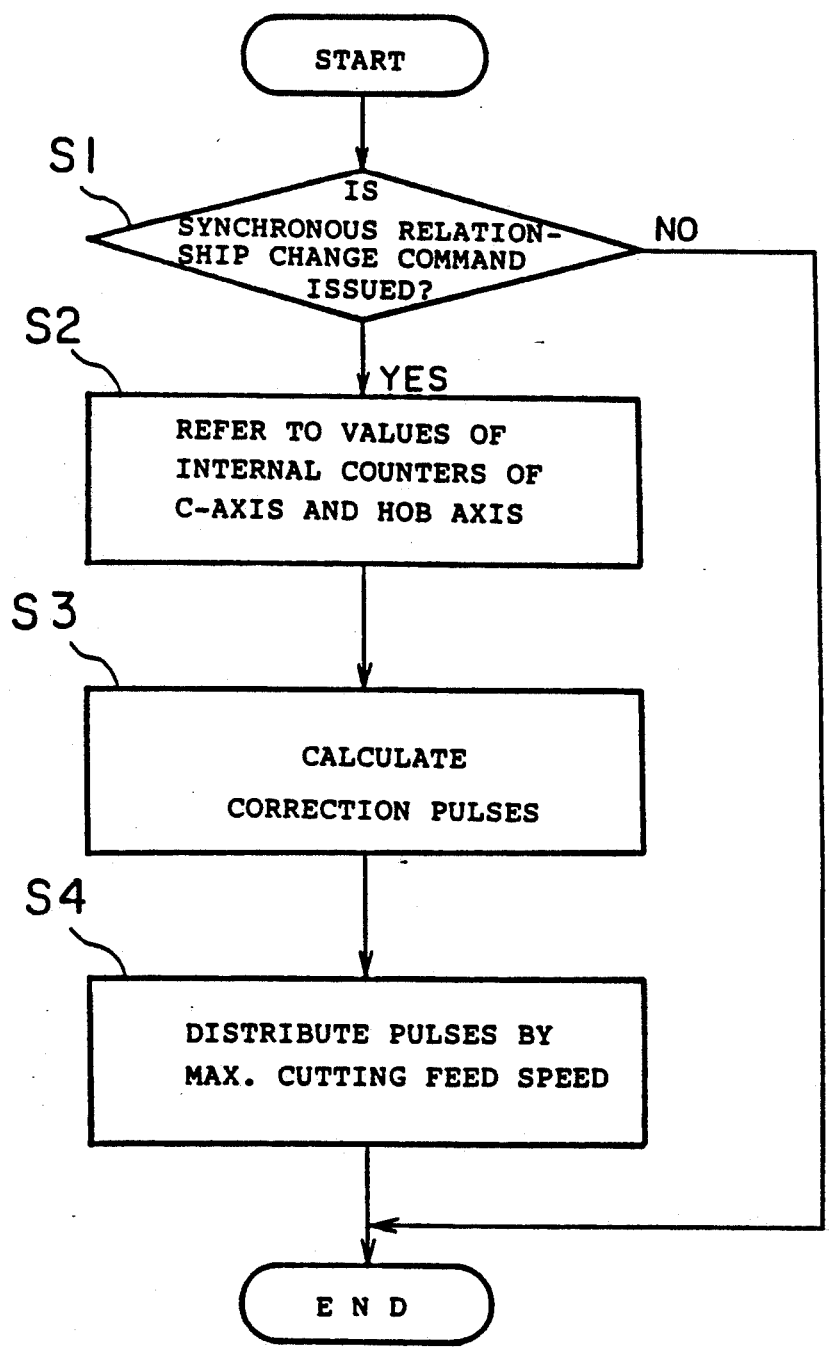
FIG. 3 is a flowchart of a synchronization change according to the present invention.

FIG. 3 is a flowchart of a synchronization change according to the present invention, wherein numerals prefixed with an S indicate the numbers of steps of the process.

[S1] It is determined whether or not a synchronous relationship change command is issued, and if so, the process goes to step S2.

[S2] Reference is made to the values of the internal counters in the hob axis and C-axis.

[S3] The correction pulses are calculated.

[S4] The correction pulses are distributed to the C-axis at the maximum cutting feed speed.

Figure 4:
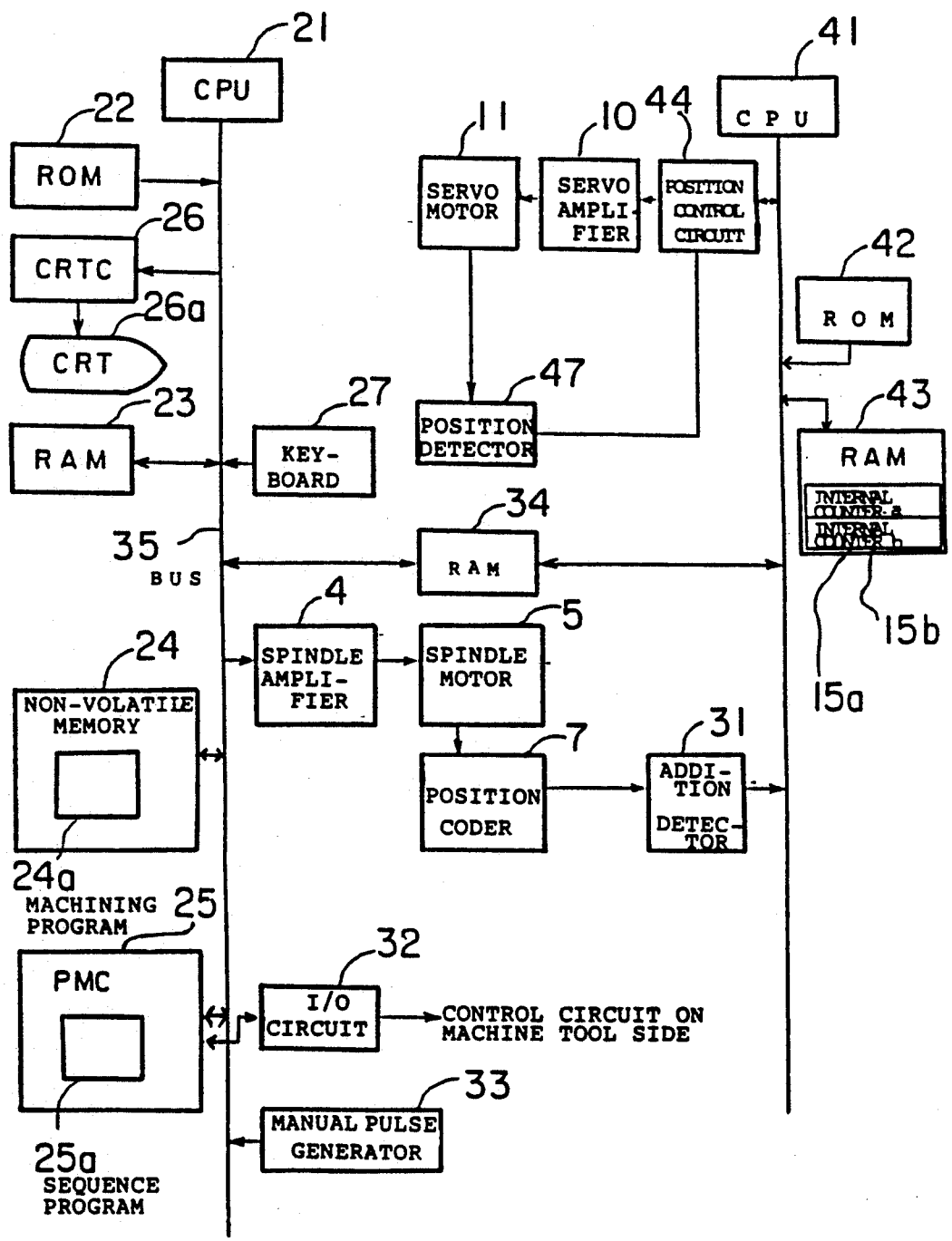
FIG. 4 is a block diagram of hardware of a numerical control apparatus and an added axis control apparatus embodying the present invention.

FIG. 4 is a block diagram of hardware of a numerical control apparatus (CNC) and an added axis control apparatus embodying the present invention. The processor 21 of the numerical control apparatus (CNC) controls the numerical control apparatus as a whole, in accordance with a system program stored in a ROM 22. The ROM 22 is an EPROM or EEPROM, and the RAM 23 is an SRAM in which various data are stored. A non-volatile memory 24 is composed of a CMOS or the like which stores a machining program 24a, amounts of parameters, and the like, and these data are maintained even after a power supply to the numerical control apparatus is cut off, because the CMOS is supplied with power from a battery and is a non-volatile memory.

A programmable machine controller (PMC) 25 receives commands such as an M function, S function, T function and the like, decodes and processes these commands through a sequence program 25a, and outputs an output signal for controlling a machine tool. Further, the PMC receives a limit switch signal from the machine tool or a switch signal from a machine control panel, processes same through the sequence program 25a, and outputs a signal necessary to control the machine tool. A signal required by the numerical control apparatus is transferred to the RAM 23 through a bus 35 and read by the processor 21.

A graphic control circuit 26 converts data such as a present position, amounts of movement and the like of each axis stored in the RAM 23 into signals for display, and supplies these signals to a display 26a to be displayed thereat. A CRT or liquid crystal display is used as the display 26a. A keyboard 27 is used to output various data.

An I/O circuit 32 transfers or receives I/O signals to or from the machine tool. More specifically, the I/O circuit 32 receives the limit switch signal from the machine tool and the switch signal from the machine control panel and these signals are read by the PMC 25. Further, the I/O circuit 32 receives an output signal for controlling the air actuator and the like of the machine tool, and outputs same to the machine tool.

A manual pulse generator 33 outputs a pulse train in response to a rotational angle, to thereby accurately move each axis. The manual pulse generator 33 is usually mounted on the machine control panel.

A spindle amplifier 4 drives a spindle motor 5, a position coder 7 outputs position detection pulses and an addition detector 31 counts synchronization pulses. Designated at 34 is a shared RAM.

The processor 41 of the added axis control apparatus controls the added axis control apparatus as a whole in accordance with a system program stored in a ROM 42. The ROM 42 is an EPROM or EEPROM. The RAM 43 is provided with internal counters 15a and 15b for counting feedback pulses of the spindle axis and command pulses of the C-axis and is composed of an SRAM. A position control circuit 44 receives a position command from the processor 41 and outputs a speed command signal for controlling the servo motor 11 to the servo amplifier 10, and the servo amplifier 10 amplifies the speed command signal to drive the servo motor 11. The servo motor 11 has a position detector 47 connected thereto, and the position detector 47 feeds back a position detection pulse to the position control circuit 44.

Although the present invention is described with reference to a synchronization change in a hobbing machine, it also can be applied to other synchronization functions in a screw cutting, a polygon-shape machining, and a super-imposed synchronization and the like.

As described above, according to the present invention, the internal counters are provided to count the feed back pulses of the hob axis and the command pulses of the C-axis, the number of pulses of both axes being synchronized and constantly monitored, and when the synchronous relationship between the hob axis and the C-axis is to be changed, correction pulses are calculated based on the values of the counters and added to the C-axis, and thus a change to a new synchronous relationship having new conditions can be immediately achieved without cancelling the synchronization, and thus a plurality of gears having different modules can be cut in a short time.

Further, the positional displacement of the synchronized hob axis and C-axis can be corrected by calculating correction pulses and distributing same to the C-axis without canceling the synchronization.

We claim:

1. A numerical control apparatus for controlling a numerically controlled machine tool such as a hobbing machine, comprising:

a synchronization control means having an axis control circuit for converting feedback pulses supplied from a position coder connected to a spindle axis for rotating a hob by a command including a ratio of an rpm of said spindle axis to an rpm of a rotation axis for rotating a gear to be cut, and for outputting a rotation command to a spindle motor and a rotation command in pulses to said rotation axis, a first internal counter for counting the feedback pulses supplied from said position coder, and a second internal counter for counting the pulses of the rotation command given to said rotation axis;

a correction pulse calculation means for calculating correction pulses for maintaining a new synchronous relationship without stopping the rotation of said spindle axis and said rotation axis when a command for a new rpm of said spindle axis and a command for a new rpm of said rotation axis are input.

2. A numerical control apparatus according to claim 1 wherein, when the new rpm of said spindle axis and the new rpm of said rotation axis are commanded, said correction pulse calculation means calculates the correction pulses to achieve a new synchronous relationship during one rotation of said spindle axis without stopping the rotation of said spindle axis and said rotation axis.

3. A numerical control apparatus according to claim 1 wherein, when a positional dislocation occurs between said spindle axis and said rotation axis to be synchronized, said correction pulse calculation means calculates correction pulses for correcting said positional dislocation.

4. A numerical control apparatus according to claim 1, including means wherein said calculated correction pulses are distributed at a speed not exceeding a maximum cutting speed of said spindle motor.

* * * * *